(12) United States Patent
Naiki

(10) Patent No.: US 12,379,475 B2
(45) Date of Patent: Aug. 5, 2025

(54) ULTRASONIC SENSOR CONTROL DEVICE, ULTRASONIC SENSOR, AND ULTRASONIC SENSOR CONTROL METHOD

(71) Applicant: ROHM Co., LTD., Kyoto (JP)

(72) Inventor: Takashi Naiki, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 339 days.

(21) Appl. No.: 18/049,818

(22) Filed: Oct. 26, 2022

(65) Prior Publication Data

US 2023/0133877 A1    May 4, 2023

(30) Foreign Application Priority Data

Oct. 29, 2021    (JP) .................. 2021-177478

(51) Int. Cl.
*G01S 7/52*       (2006.01)
*G01S 15/08*      (2006.01)

(52) U.S. Cl.
CPC .......... *G01S 7/52004* (2013.01); *G01S 15/08* (2013.01)

(58) Field of Classification Search
CPC .............................. G01S 7/52004; G01S 15/08
See application file for complete search history.

(56) References Cited

U.S. PATENT DOCUMENTS

2015/0141830 A1*  5/2015  Kakee .............. G01S 7/52085
                                                    600/447
2018/0106893 A1*  4/2018  Kim ................... G01S 7/52004

FOREIGN PATENT DOCUMENTS

JP    2007229015 A  *  9/2007
JP    2020060410        4/2020
JP    2020060410 A  *  4/2020

* cited by examiner

*Primary Examiner* — Isam A Alsomiri
*Assistant Examiner* — Abdallah Abulaban
(74) *Attorney, Agent, or Firm* — CHIP LAW GROUP

(57) ABSTRACT

Disclosed is an ultrasonic sensor control device including a transmission control section configured to control a transmitting device configured to transmit a transmission ultrasonic wave, a receiving section configured to receive a reception ultrasonic wave, a frequency determining section configured to determine a result of comparing a reception frequency that is a frequency of the reception ultrasonic wave received by the receiving section and that is a frequency capable of being received by the receiving section, with a transmission frequency of the transmission ultrasonic wave that is transmitted under the control of the transmission control section, and a frequency switching section configured to change the transmission frequency and the reception frequency on the basis of a result of the determination by the frequency determining section.

5 Claims, 14 Drawing Sheets

| FREQUENCY INFORMATION | FIRST FREQUENCY | 45kHz |
| --- | --- | --- |
| | SECOND FREQUENCY | 50kHz |
| | THIRD FREQUENCY | 55kHz |
| TRANSMISSION INFORMATION | TRANSMISSION STATE | BEFORE TRANSMISSION |
| | TRANSMISSION FREQUENCY | 45kHz |
| RECEPTION INFORMATION | RECEPTION STATE | RECEIVED |
| | RECEPTION FREQUENCY | 45kHz |

F I G . 5
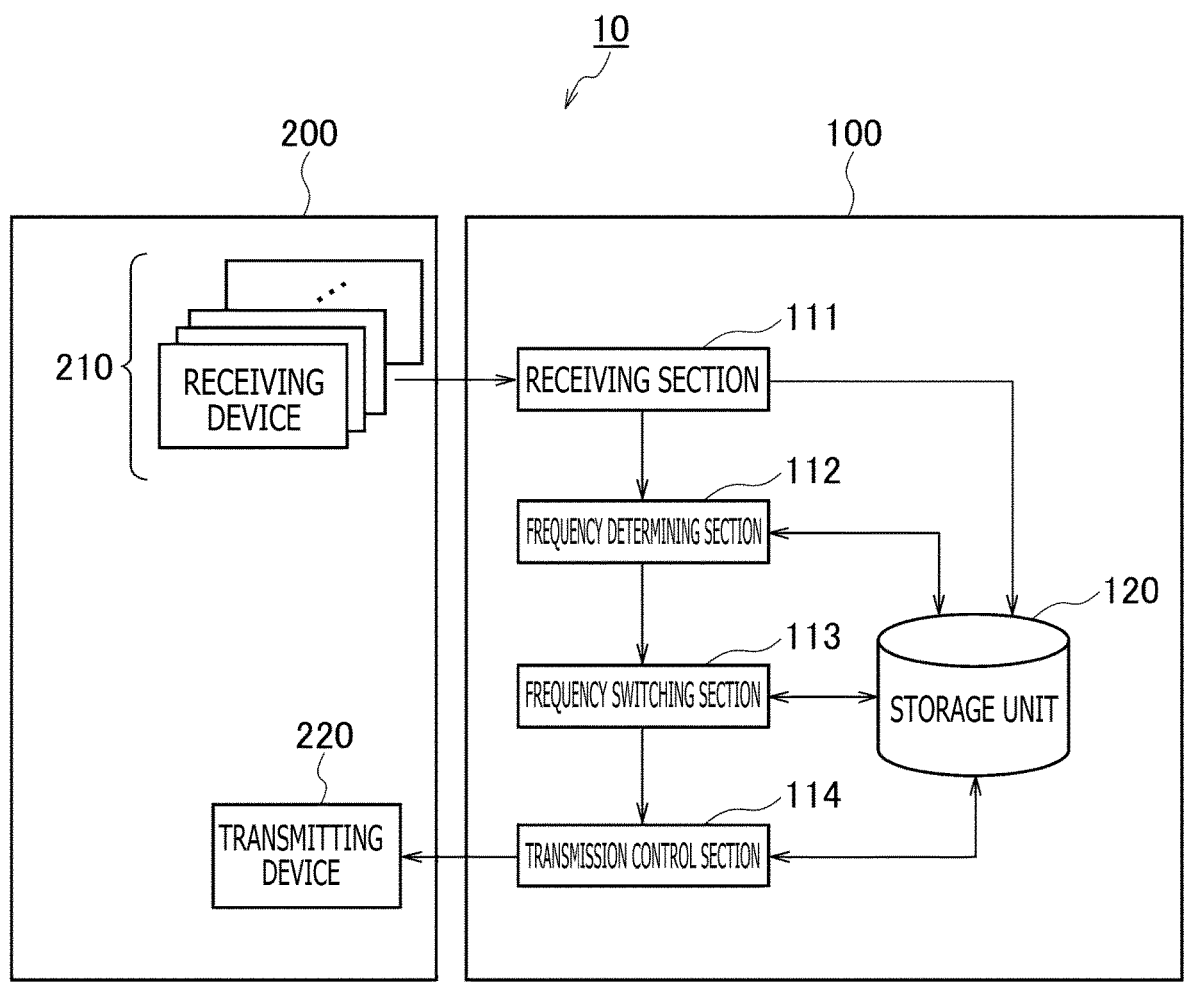

| FREQUENCY INFORMATION | FIRST FREQUENCY | | 40kHz |
| --- | --- | --- | --- |
| | SECOND FREQUENCY | | 45kHz |
| | THIRD FREQUENCY | | 50kHz |
| | ... | | ... |
| TRANSMISSION INFORMATION | TRANSMISSION STATE | | BEFORE TRANSMISSION |
| | TRANSMISSION FREQUENCY | | 45kHz |
| RECEPTION INFORMATION | FIRST RECEIVING DEVICE | RECEPTION STATE | RECEIVED |
| | | RECEPTION FREQUENCY | 50kHz |
| | SECOND RECEIVING DEVICE | RECEPTION STATE | RECEIVED |
| | | RECEPTION FREQUENCY | 45kHz |
| | ... | ... | ... |
| | n-TH RECEIVING DEVICE | RECEPTION STATE | RECEIVED |
| | | RECEPTION FREQUENCY | 55kHz |

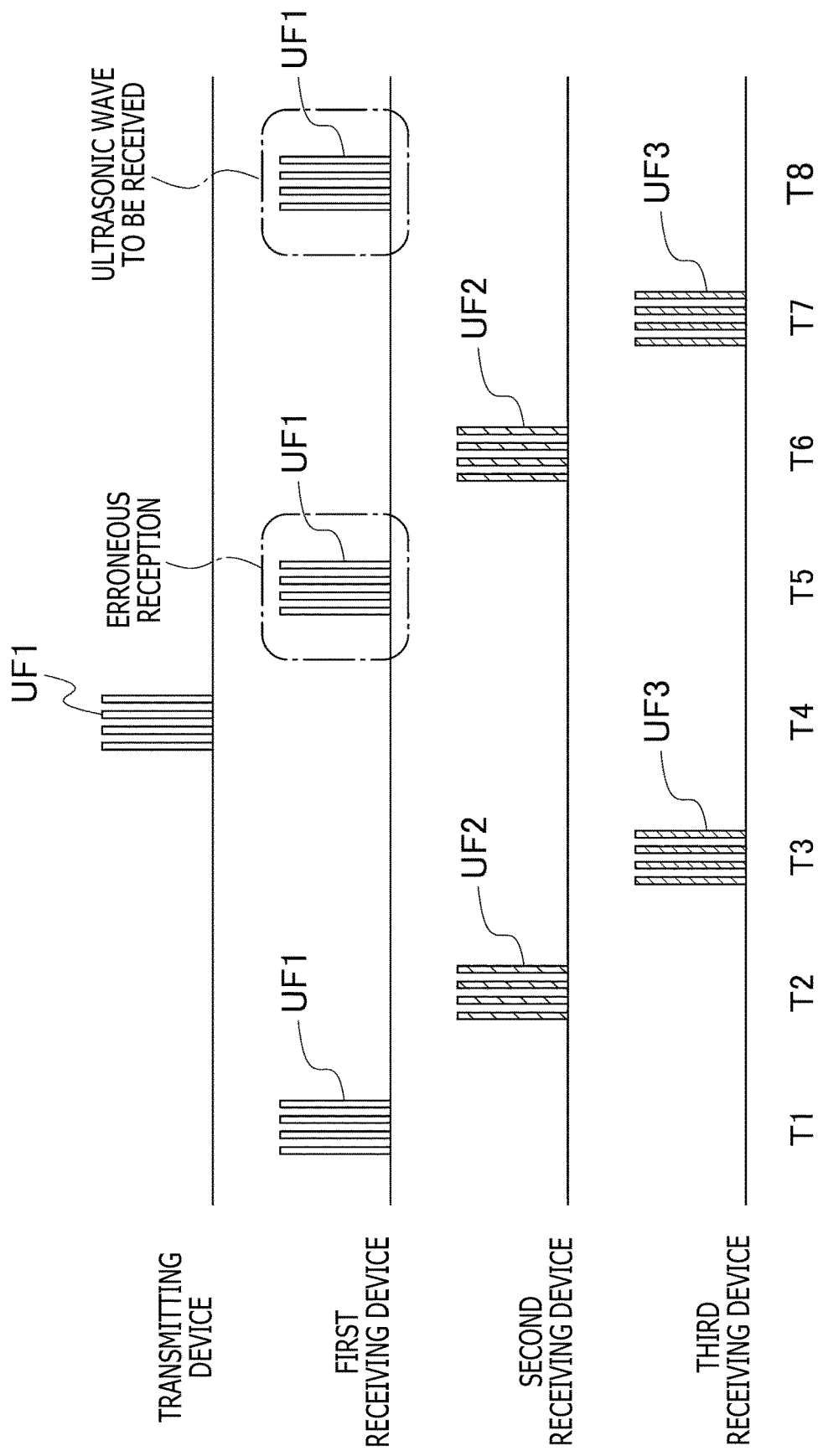

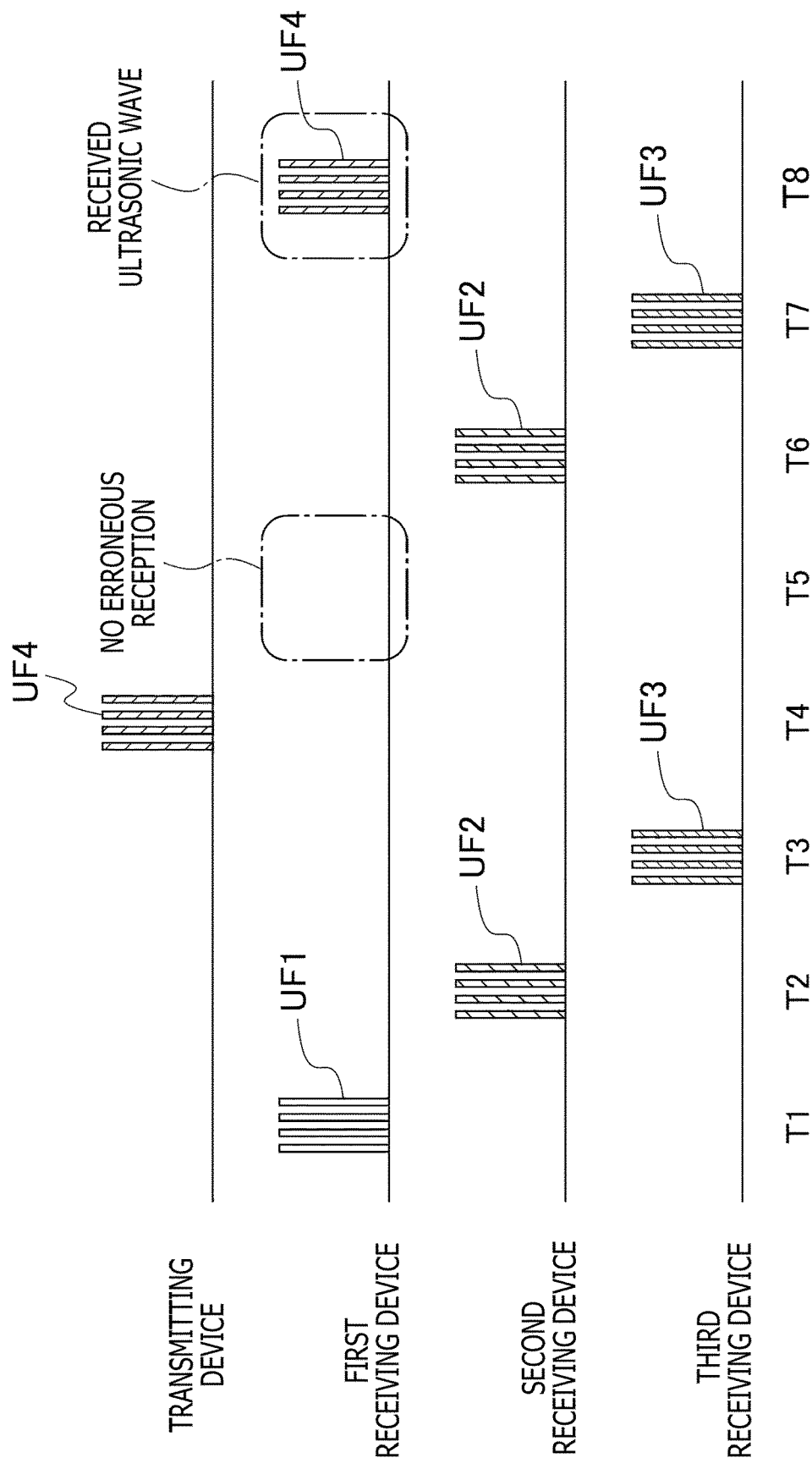

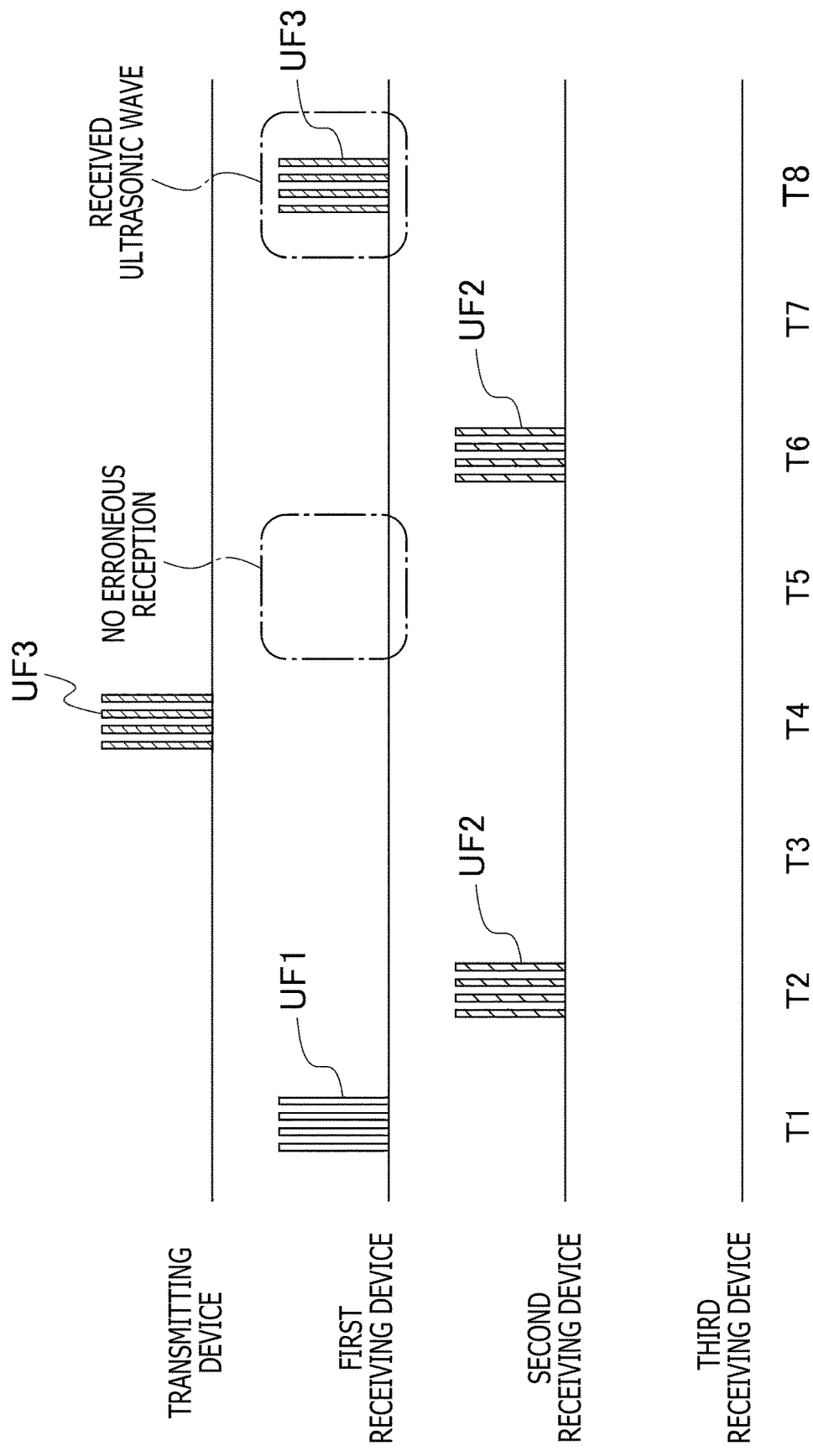

| FREQUENCY INFORMATION | FIRST FREQUENCY | | 40kHz |
| --- | --- | --- | --- |
| | SECOND FREQUENCY | | 45kHz |
| | THIRD FREQUENCY | | 50kHz |
| | ... | | ... |
| TRANSMISSION INFORMATION | FIRST TRANSMITTING DEVICE | TRANSMISSION STATE | BEFORE TRANSMISSION |
| | | TRANSMISSION FREQUENCY | 45kHz |
| | | TRANSMISSION TIME | TIMING A |
| | SECOND TRANSMITTING DEVICE | TRANSMISSION STATE | BEFORE TRANSMISSION |
| | | TRANSMISSION FREQUENCY | 50kHz |
| | | TRANSMISSION TIME | TIMING A + TIME B |
| RECEPTION INFORMATION | FIRST RECEIVING DEVICE | RECEPTION STATE | RECEIVED |
| | | RECEPTION FREQUENCY | 45kHz |
| | | RECEPTION TIME | TIMING C |
| | SECOND RECEIVING DEVICE | RECEPTION STATE | RECEIVED |
| | | RECEPTION FREQUENCY | 50kHz |
| | | RECEPTION TIME | TIMING D |

ULTRASONIC SENSOR CONTROL DEVICE, ULTRASONIC SENSOR, AND ULTRASONIC SENSOR CONTROL METHOD

CROSS REFERENCE TO RELATED APPLICATIONS

This application claims priority benefit of Japanese Patent Application No. JP 2021-177478 filed in the Japan Patent Office on Oct. 29, 2021. Each of the above-referenced applications is hereby incorporated herein by reference in its entirety.

BACKGROUND

The present disclosure relates to an ultrasonic sensor control device, an ultrasonic sensor, and an ultrasonic sensor control method.

In the past, in an ultrasonic wave system that measures a distance to a target object by measuring a time from the generation of an ultrasonic wave to the returning of the wave after being reflected by the target object, a method has been proposed for avoiding interference from an ultrasonic wave transmitted from another system. Japanese Patent Laid-Open No. 2020-60410 (hereinafter, referred to as Patent Document 1) discloses an acoustic wave processing device having a function for avoiding interference from an ultrasonic wave transmitted from another system. The acoustic wave processing device disclosed in Patent Document 1 transmits ultrasonic waves with characteristics (patterns) based on the phase difference, burst wave interval, burst duration, and amplitude level ratio of the two ultrasonic waves transmitted successively. Thus, interference from an ultrasonic wave transmitted from another system is prevented.

SUMMARY

However, there is a limit to the characteristics (patterns) provided to the ultrasonic waves to be transmitted, and a case is conceivable in which ultrasonic waves are transmitted with identical characteristics (patterns) when identical systems are used. Sufficient studies have hitherto not been made regarding a mechanism for cancelling crosstalk in a case where interference (crosstalk) from an ultrasonic wave transmitted from another system occurs, and therefore, there is a possibility that erroneous distance measurement may be performed when the interference from the ultrasonic wave of the other system occurs.

In view of circumstances as described above, it is desirable to provide an ultrasonic sensor control device that can easily cancel crosstalk in an ultrasonic sensor.

An ultrasonic sensor control device according to an example of the present embodiment includes a transmission control section configured to control a transmitting device configured to transmit a transmission ultrasonic wave, a receiving section configured to receive a reception ultrasonic wave, a frequency determining section configured to determine a result of comparing a reception frequency that is a frequency of the reception ultrasonic wave received by the receiving section and that is a frequency capable of being received by the receiving section, with a transmission frequency of the transmission ultrasonic wave that is transmitted under the control of the transmission control section, and a frequency switching section configured to change the transmission frequency and the reception frequency on the basis of a result of the determination by the frequency determining section.

An ultrasonic sensor according to another example of the present embodiment includes an ultrasonic sensor device configured to transmit and receive an ultrasonic wave, a transmission control section configured to control transmission of a transmission ultrasonic wave via the ultrasonic sensor device, a receiving section configured to receive a reception ultrasonic wave via the ultrasonic sensor device, a frequency determining section configured to determine a result of comparing a reception frequency that is a frequency of the reception ultrasonic wave received by the receiving section and that is a frequency capable of being received by the receiving section, with a transmission frequency of the transmission ultrasonic wave that is transmitted under the control of the transmission control section, and a frequency switching section configured to change the transmission frequency and the reception frequency on the basis of a result of the determination by the frequency determining section.

An ultrasonic sensor control method according to yet another example of the present embodiment includes controlling a transmitting device configured to transmit a transmission ultrasonic wave, receiving a reception ultrasonic wave from a receiving device, determining a result of comparing a reception frequency that is a frequency of the received reception ultrasonic wave and that is a frequency capable of being received via the receiving device, with a transmission frequency of the transmission ultrasonic wave, and changing the transmission frequency of the transmission ultrasonic wave and the reception frequency on the basis of a result of the determination based on the comparison between the reception frequency and the transmission frequency.

According to the present disclosure, it is possible to provide an ultrasonic sensor control device that can easily cancel crosstalk of an ultrasonic sensor.

BRIEF DESCRIPTION OF THE DRAWINGS

FIG. 2 is a diagram illustrating an example of frequency information, transmission information, and reception information according to the first embodiment;

FIG. 5 is a block diagram illustrating a configuration of an ultrasonic sensor control device according to a second embodiment;

FIG. 6 is a diagram illustrating an example of frequency information, transmission information, and reception information according to the second embodiment;

FIG. 7A is a timing diagram of assistance in explaining a state of crosstalk in an ultrasonic sensor;

FIG. 7B is a timing diagram of assistance in explaining processing in the ultrasonic sensor control device according to the second embodiment;

FIG. 7C is a timing diagram of assistance in explaining processing in the ultrasonic sensor control device according to the second embodiment;

DETAILED DESCRIPTION OF THE PREFERRED EMBODIMENTS

Figure 1:
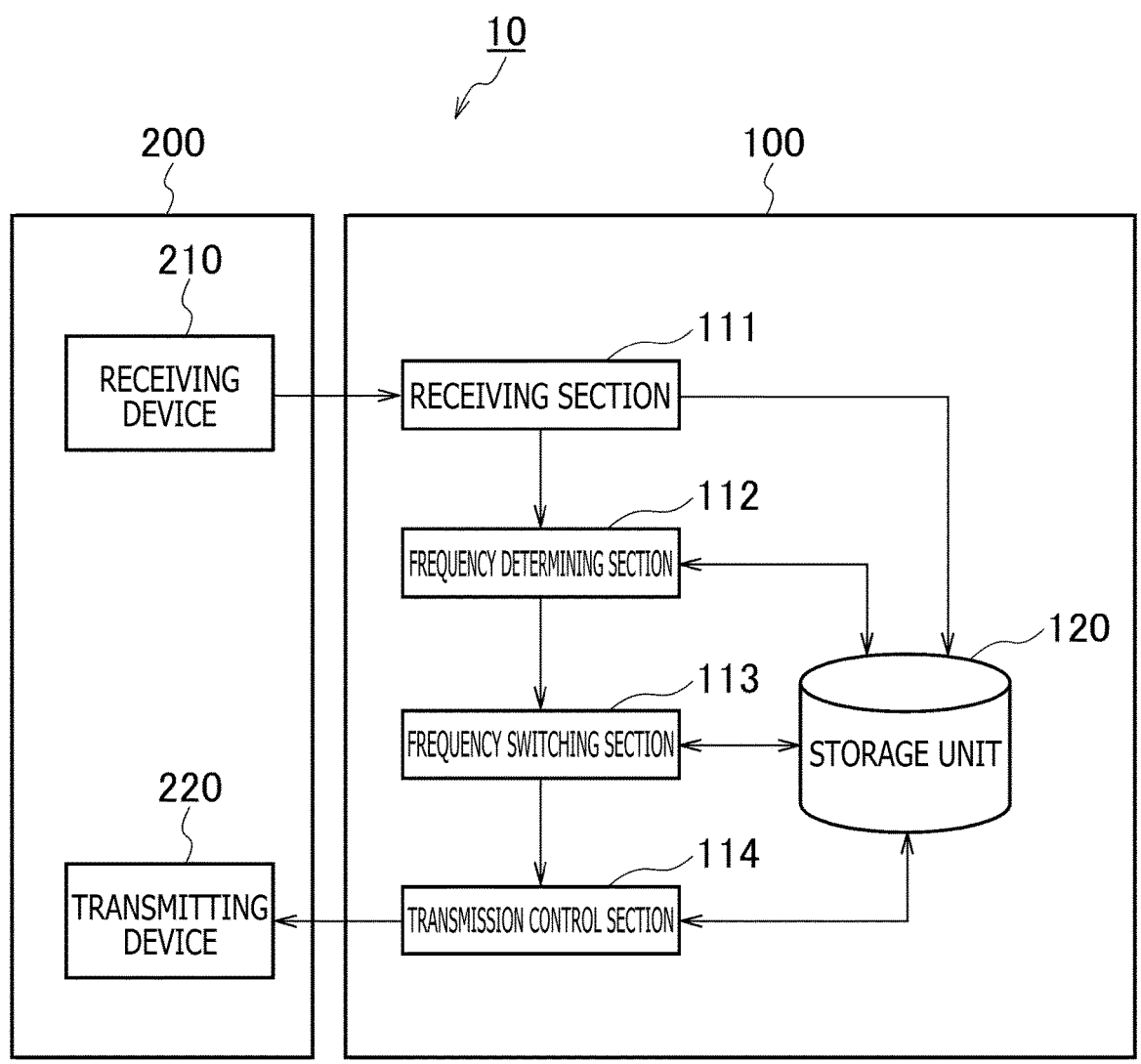
FIG. 1 is a block diagram illustrating a configuration of an ultrasonic sensor control device according to a first embodiment.

With regard to the time length ratio, the number of pulses, the polarities, and/or other features in timing diagrams illustrated in drawings, it is needless to say that some of them may be different from actual ones.

In addition, embodiments illustrated in the following are examples of devices and methods for embodying technical concepts, and the material, shape, structure, arrangement, or other configuration of each constituent part is not limited to the one described below. Various changes can be made to the present embodiment in claims.

One specific example of the present embodiment is as follows.

<1> An ultrasonic sensor control device including a transmission control section configured to control a transmitting device configured to transmit a transmission ultrasonic wave, a receiving section configured to receive a reception ultrasonic wave, a frequency determining section configured to determine a result of comparing a reception frequency that is a frequency of the reception ultrasonic wave received by the receiving section and that is a frequency capable of being received by the receiving section, with a transmission frequency of the transmission ultrasonic wave that is transmitted under the control of the transmission control section, and a frequency switching section configured to change the transmission frequency and the reception frequency on the basis of a result of the determination by the frequency determining section.

<2> The ultrasonic sensor control device according to <1>, in which the frequency determining section determines whether or not the reception frequency of the reception ultrasonic wave received by the receiving section and the transmission frequency are different from each other, in a predetermined period of time before a timing of transmission of the transmission ultrasonic wave, and when the frequency determining section determines that the reception frequency and the transmission frequency are the same, the frequency switching section switches the transmission frequency and the reception frequency to a frequency different from the frequency scheduled to be transmitted.

<3> The ultrasonic sensor control device according to <1>, in which the receiving section receives a plurality of the reception ultrasonic waves from a plurality of receiving devices configured to receive the plurality of reception ultrasonic waves, the frequency determining section determines whether or not the reception frequency of the reception ultrasonic wave received by the receiving section and the transmission frequency are different from each other, in a predetermined period of time before a timing of transmission of the transmission ultrasonic wave, and when the frequency determining section determines that the reception frequency and the transmission frequency are the same, the frequency switching section switches the transmission frequency and a plurality of reception frequencies of the plurality of reception ultrasonic waves to a frequency different from the frequencies capable of being received by the plurality of receiving devices at a time point of the determination by the frequency determining section.

<4> The ultrasonic sensor control device according to <1>, in which the receiving section receives a plurality of the reception ultrasonic waves from a plurality of receiving devices configured to receive the plurality of reception ultrasonic waves, the frequency determining section determines whether or not the reception frequency of the reception ultrasonic wave received by the receiving section and the transmission frequency are different from each other, in a predetermined period of time before a timing of transmission of the transmission ultrasonic wave, and when the frequency determining section determines that the reception frequency and the transmission frequency are the same, the frequency switching section switches the transmission frequency and a plurality of reception frequencies of the plurality of reception ultrasonic waves to a frequency that is included in frequencies capable of being received by the plurality of receiving devices at a time point of the determination by the frequency determining section and that is different from the reception frequency of the reception ultrasonic wave received by the receiving section.

<5> The ultrasonic sensor control device according to <1>, in which the transmission control section controls the transmitting device such that the transmitting device successively transmits a first transmission ultrasonic wave of a first transmission frequency and a second transmission ultrasonic wave of a second transmission frequency, the receiving section receives a first reception ultrasonic wave and a second reception ultrasonic wave from a plurality of receiving devices configured to receive a plurality of the reception ultrasonic waves, the frequency determining section determines a result of comparing a first reception frequency of the first reception ultrasonic wave and a second reception frequency of the second reception ultrasonic wave with the first transmission frequency and the second transmission frequency, and when the first reception frequency is different from the first transmission frequency or when the second reception frequency is different from the second transmission frequency, the frequency switching section switches the first transmission frequency, the second transmission frequency, the first reception frequency, and the second reception frequency to frequencies different from the first transmission frequency and the second transmission frequency.

<6> The ultrasonic sensor control device according to <1>, in which the transmission control section controls a plurality of the transmitting devices such that the transmitting devices transmit a first transmission ultrasonic wave of a first transmission frequency and a second transmission ultrasonic wave of a second transmission frequency simultaneously, the receiving section receives a first reception ultrasonic wave and a second reception ultrasonic wave from a plurality of receiving devices configured to receive a plurality of the reception ultrasonic waves, the frequency determining section determines a result of comparing a first reception frequency of the first reception ultrasonic wave and a second reception frequency of the second reception ultrasonic wave with the first transmission frequency and the second transmission frequency, and when the first reception frequency and the second reception frequency are the same frequency as either the first transmission frequency or the second transmission frequency and when the first reception ultrasonic wave and the second reception ultrasonic wave are not received in same timing, the frequency switching section switches the first transmission frequency, the second transmission frequency, the first reception frequency, and the second reception frequency to frequencies different from the first transmission frequency and the second transmission frequency.

<7> An ultrasonic sensor including an ultrasonic sensor device configured to transmit and receive an ultrasonic wave, a transmission control section configured to control transmission of a transmission ultrasonic wave via the ultrasonic sensor device, a receiving section configured to receive a reception ultrasonic wave via the ultrasonic sensor device, a frequency determining section configured to determine a result of comparing a reception frequency that is a frequency of the reception ultrasonic wave received by the receiving section and that is a frequency capable of being received by the receiving section, with a transmission frequency of the transmission ultrasonic wave that is transmitted under the control of the transmission control section, and a frequency switching section configured to change the transmission frequency and the reception frequency on the basis of a result of the determination by the frequency determining section.

<8> An ultrasonic sensor control method including controlling a transmitting device configured to transmit a transmission ultrasonic wave, receiving a reception ultrasonic wave from a receiving device, determining a result of comparing a reception frequency that is a frequency of the received reception ultrasonic wave and that is a frequency capable of being received via the receiving device, with a transmission frequency of the transmission ultrasonic wave, and changing the transmission frequency of the transmission ultrasonic wave and the reception frequency on the basis of a result of the determination based on the comparison between the reception frequency and the transmission frequency.

First Embodiment

A configuration of an ultrasonic sensor 10 according to a first embodiment will be described with reference to FIG. 1. The ultrasonic sensor 10 includes an ultrasonic sensor control device 100 and an ultrasonic sensor device 200. The ultrasonic sensor 10 in the present embodiment is a sensor that can transmit an ultrasonic wave and that can also receive the ultrasonic wave. The ultrasonic sensor 10 is used in, for example, a distance measuring system that can measure a distance to a target object by measuring a time from the transmission of an ultrasonic wave to the returning of the wave after being reflected by the target object (time of flight (TOF)).

The ultrasonic sensor control device 100 includes a receiving section 111, a frequency determining section 112, a frequency switching section 113, a transmission control section 114, and a storage unit 120. The ultrasonic sensor device 200 is an ultrasonic sensor device including a receiving device 210 that receives an ultrasonic wave and a transmitting device 220. The ultrasonic sensor device 200 has, for example, a transducer utilizing a piezoelectric effect. When a predetermined voltage is applied to the transmitting device 220, a piezoelectric vibrator (not illustrated) included in the transmitting device 220 is vibrated and made to generate an ultrasonic wave. In addition, when the ultrasonic wave of a predetermined frequency reaches the receiving device 210, a predetermined voltage occurs in a piezoelectric vibrator (not illustrated) of the receiving device 210, and the receiving device 210 can receive the ultrasonic wave through detection of the voltage.

The receiving section 111 receives the reception ultrasonic wave via the receiving device 210, and stores reception information related to the reception ultrasonic wave in the storage unit 120. Specifically, the receiving section 111 receives the reception ultrasonic wave via the receiving device 210 at a reception frequency included in the reception information stored in the storage unit 120, and stores the contents indicating "received," as a reception state included in the reception information stored in the storage unit 120.

The frequency determining section 112 determines whether or not a transmission ultrasonic wave has been transmitted, on the basis of a transmission state included in transmission information stored in the storage unit 120. In addition, on the basis of a transmission frequency included in the transmission information and the reception frequency included in the reception information, the transmission information and the reception information being stored in the storage unit 120, the frequency determining section 112 compares the reception frequency of the reception ultrasonic wave and the transmission frequency of the transmission ultrasonic wave with each other, and determines whether or not the reception frequency and the transmission frequency are the same.

Incidentally, in the present specification, a case where the "frequencies are the same" is not limited to a case where the frequencies as targets for the determination are completely the same, and includes a case where the frequencies as targets for the determination are the same within a predetermined range. For example, in a case where measurement specifications of the ultrasonic sensor 10 are set such that "a speed relative to a measurement target object is ±5 km/h under the conditions where a sound source frequency is 40 kHz and an operating temperature is −20° C. to 60° C.," a frequency range is as follows. Specifically, with respect to the frequency of 40 kHz, the lowest reception frequency of the wave returned after being reflected by the target object is 39,653.5 Hz (with the distance increasing at 5 km/h at a time of −20° C.). Similarly, the highest reception frequency of the wave returned after being reflected by the target object is 40,303.0 Hz (with the distance decreasing at 5 km/h at a time of +60° C.). Incidentally, in both of these cases, suppose that a significant figure is 0.1 Hz, that a sound source tolerance is 0, and that the speed of sound is (331.5+0.61T) m/s (T is an atmospheric temperature). That is, in a case where the frequency as a target for the determination is 40 kHz and where the frequency as a target for the comparison is in a range of 39,653.5 to 40,303.0 Hz, for example, the frequency determining section 112 determines that the "frequencies are the same." Note that the predetermined range in the frequency determination is not limited to the values in the above-described example, and differs according to the measurement specifications of the ultrasonic sensor 10 and the value of the target frequency.

When the frequency determining section 112 determines that the frequencies are the same, the frequency switching section 113 switches and changes the transmission frequency included in the transmission information and the reception frequency included in the reception information, the transmission information and the reception information being stored in the storage unit 120, to a different frequency. That is, when the frequency determining section 112 determines that the reception frequency and the transmission frequency are the same in a predetermined period of time before a timing of transmission of the transmission ultrasonic wave from the transmitting device 220, the frequency switching section 113 switches and changes the transmission frequency of the transmission ultrasonic wave to a frequency different from the frequency scheduled to be transmitted. Incidentally, in the present embodiment, the predetermined period of time is a period of time from the starting of the ultrasonic sensor control device 100 to the timing of transmission of the transmission ultrasonic wave by the transmitting device 220. In addition, suppose that the predetermined period of time can be set as desired. For example, in a case where crosstalk from an ultrasonic wave transmitted from another device is desired to be determined more accurately, this predetermined period of time may be set longer than a default (initially set) period.

The transmission control section 114 controls the transmission of the transmission ultrasonic wave from the transmitting device 220. Specifically, the transmission control section 114 causes the transmitting device 220 to transmit the transmission ultrasonic wave at the transmission frequency included in the transmission information stored in the storage unit 120. In addition, after the transmission of the transmission ultrasonic wave, the transmission control section 114 changes the transmission state included in the transmission information stored in the storage unit 120, to "transmitted."

The storage unit 120 includes a read only memory (ROM), a random access memory (RAM), or a hard disk, for example. The storage unit 120 stores "frequency information," "transmission information," and "reception information." Specifically, the storage unit 120 stores information illustrated in FIG. 2. Incidentally, the "frequency information," the "transmission information," and the "reception information" stored in the storage unit 120 may be configured as regions provided in one storage device and divided from one another physically or logically. Alternatively, a configuration in which storage units 120 of the respective pieces of data are provided in a plurality of physically different storage devices may be adopted.

Frequencies of ultrasonic waves that can be handled in the ultrasonic sensor 10 are stored in the "frequency information" in the storage unit 120. Specifically, frequencies at which the receiving device 210 of the ultrasonic sensor device 200 can receive the ultrasonic wave and at which the transmitting device 220 of the ultrasonic sensor device 200 can transmit the ultrasonic wave are stored. In addition, the values of the frequencies stored in the "frequency information" are assumed to be separated from one another to a degree that crosstalk does not occur in consideration of a Doppler shift, reception characteristics, and other characteristics. For example, in the example illustrated in FIG. 2, the fields of a first frequency, a second frequency, and a third frequency in the "frequency information" store, as the values of the frequencies, 45 kHz, 50 kHz, and 55 kHz each separated from another by 5 kHz. The ultrasonic sensor control device 100 selects a frequency stored in the "frequency information" to transmit and receive an ultrasonic wave.

Information related to the transmission ultrasonic wave that is transmitted via the transmitting device 220 is stored in the "transmission information" in the storage unit 120. Specifically, a "transmission state" indicating whether or not the transmission ultrasonic wave has been transmitted from the transmitting device 220 is stored. As the "transmission state," information indicating "before transmission" is stored before the transmission ultrasonic wave is transmitted from the transmitting device 220. In addition, as the "transmission state," information indicating "transmitted" is stored after the transmission ultrasonic wave is transmitted from the transmitting device 220.

In addition, information related to the transmission frequency is stored in the "transmission information." As the transmission frequency in the "transmission information," the frequency scheduled to be transmitted is stored before the transmission ultrasonic wave is transmitted from the transmitting device 220. In addition, as the transmission frequency in the "transmission information," the frequency of the transmission ultrasonic wave actually transmitted is stored after the transmission ultrasonic wave is transmitted from the transmitting device 220.

Information related to the reception ultrasonic wave received via the receiving device 210 is stored in the "reception information" in the storage unit 120. Specifically, a "reception state" indicating whether or not the reception ultrasonic wave is received by the receiving device 210 is stored. As the "reception state," information indicating "not received" is stored before the reception ultrasonic wave is received from the receiving device 210. In addition, as the "reception state," information indicating "received" is stored after the reception ultrasonic wave is received from the receiving device 210.

In addition, information related to the reception frequency is stored in the "reception information." The frequency of the reception ultrasonic wave that can be received from the receiving device 210 is stored as the reception frequency in the "reception information." That is, the reception frequency in the "reception information" is a frequency capable of being received by the receiving device 210.

Here, processing performed by the ultrasonic sensor control device 100 will be described with reference to timing diagrams of FIG. 3A and FIG. 3B. In the timing diagrams illustrated in FIG. 3A and FIG. 3B, a difference between frequencies of ultrasonic waves is schematically represented by using graphic patterns and reference signs UF1 and UF2. Incidentally, suppose that UF1 denotes the first frequency of an ultrasonic wave and that UF2 denotes the second frequency of an ultrasonic wave. In subsequent timing diagrams, the difference between frequencies of ultrasonic waves are schematically represented as in FIG. 3A and FIG. 3B.

Figure 3A:
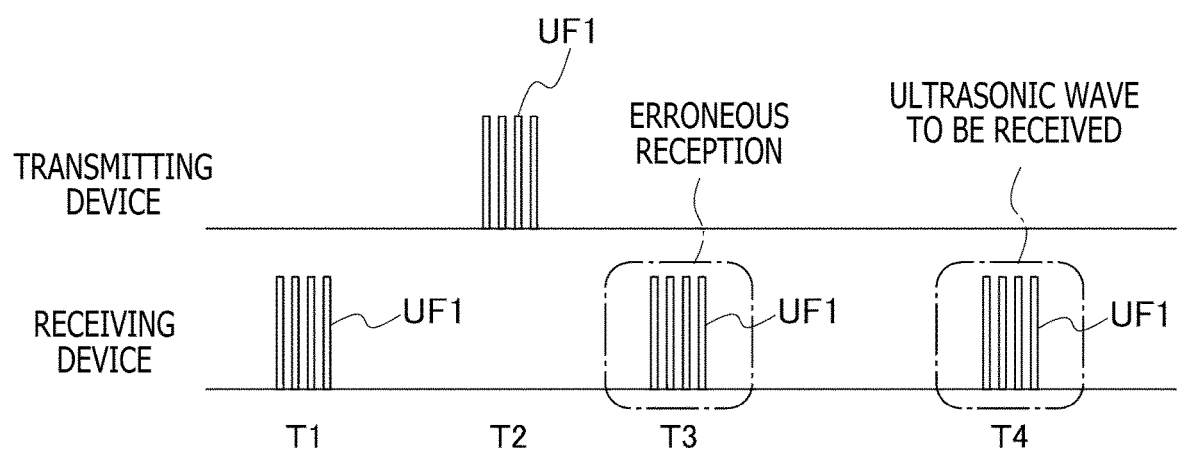
FIG. 3A is a timing diagram of assistance in explaining a state of crosstalk in an ultrasonic sensor.
Figure 3B:
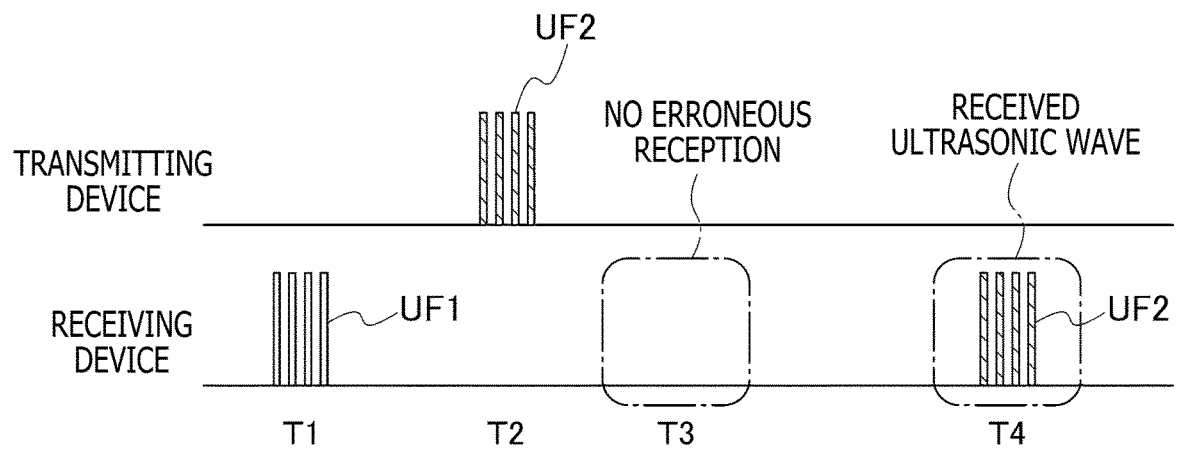
FIG. 3B is a timing diagram of assistance in explaining processing in the ultrasonic sensor control device according to the first embodiment.

Suppose in FIG. 3A and FIG. 3B that the first frequency (UF1), for example, is set as the transmission frequency and reception frequency at a time of a start of the ultrasonic sensor control device 100. That is, the ultrasonic sensor control device 100 transmits an ultrasonic wave of the first frequency (UF1), receives the wave reflected by a target object at the first frequency (UF1), and thus measures a distance to the target object.

Suppose in FIG. 3A that the transmitting device 220 transmits an ultrasonic wave at time T2, the transmitted ultrasonic wave is reflected by the target object, and the reflected ultrasonic wave is received by the receiving device 210 at time T4. Meanwhile, suppose in FIG. 3A that another device which is different from the ultrasonic sensor control device 100 transmits an ultrasonic wave, and the transmitted ultrasonic wave is received by the receiving device 210 at the first frequency (UF1) at time T1 and time T3. The other device in the present embodiment is not limited to another ultrasonic sensor 10, and may be a distance measuring system using another ultrasonic sensor using a frequency of an ultrasonic wave close to that handled by the ultrasonic sensor 10 or may be a repelling device for use against animal damage, for example.

In this case, in the example illustrated in FIG. 3A, the ultrasonic sensor control device 100 recognizes the ultrasonic wave received by the receiving device 210 at time T3, as the ultrasonic wave transmitted from the transmitting device 220 at time T2 and then reflected by the target object. The target ultrasonic wave should be received at time T4, but the different ultrasonic wave is erroneously received at time T3. Thus, a time from the transmission of the ultrasonic wave from the transmitting device 220 to the reception of the ultrasonic wave is shortened. That is, the ultrasonic sensor may not perform distance measurement accurately.

On the other hand, in the example illustrated in FIG. 3B, when an ultrasonic wave of the first frequency is received by the receiving device 210 at time T1, the frequency determining section 112 determines that the ultrasonic wave of the first frequency (UF1) as the transmission frequency is received in a timing before the transmitting device 220 transmits the ultrasonic wave (time T2).

On the basis of the result of the determination by the frequency determining section 112, the frequency switching section 113 switches the transmission frequency and the reception frequency to the second frequency (UF2) different from the first frequency (UF1). Consequently, in the example illustrated in FIG. 3B, no ultrasonic wave of the first frequency (UF1) is received at time T3 as the ultrasonic wave transmitted from the transmitting device 220. In addition, an ultrasonic wave of the second frequency (UF2) can be received correctly at time T4. It is thus possible to cancel crosstalk from another device and perform accurate distance measurement in the distance measuring system using the ultrasonic sensor control device 100.

Outline of Processing Flow of Ultrasonic Sensor Control Device 100

Figure 4:
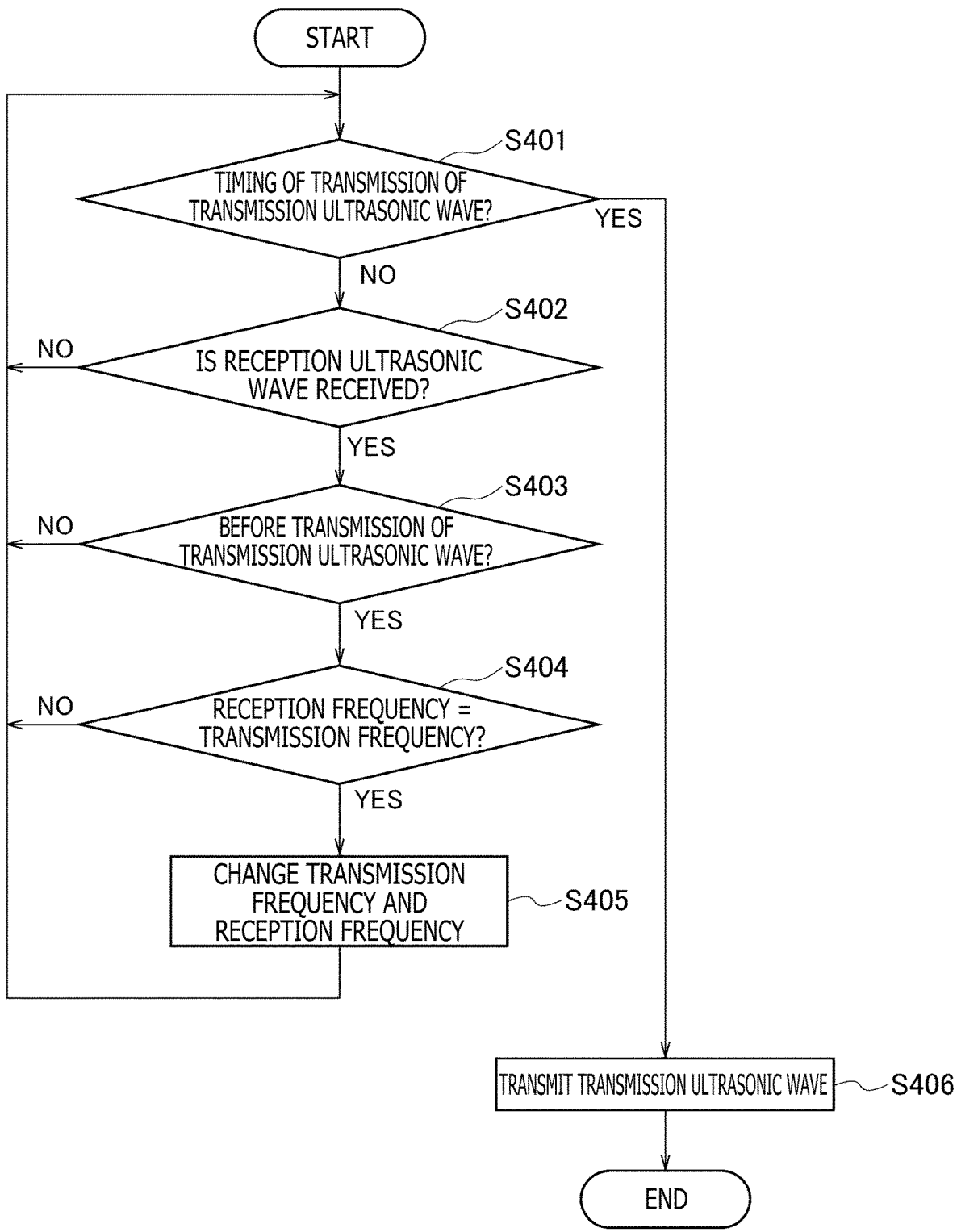
FIG. 4 is a flowchart illustrating an example of processing performed by the ultrasonic sensor control device according to the first embodiment.

Next, a flow of processing in the ultrasonic sensor control device 100 (ultrasonic sensor control method) will be illustrated with reference to a flowchart of FIG. 4. A series of operations of the ultrasonic sensor control device 100 illustrated in the flowchart of FIG. 4 is started when the ultrasonic sensor control device 100 is started, and the processing is ended in response to the transmission of a transmission ultrasonic wave. Further, the processing in the flowchart illustrated in FIG. 4 is also ended in response to the turning off of the power or a processing termination interrupt. In addition, in the following description of the flowchart, the same contents as described in conjunction with the foregoing ultrasonic sensor control device 100 will be omitted or described in a simplified manner.

In step S401, the transmission control section 114 determines whether or not it is a timing of transmission of a transmission ultrasonic wave. When the transmission control section 114 determines in step S401 that it is the timing of transmission of a transmission ultrasonic wave (step S401: YES), the processing proceeds to step S406. When the transmission control section 114 determines in step S401 that it is not the timing of transmission of a transmission ultrasonic wave (step S401: NO), on the other hand, the processing proceeds to step S402.

In step S402, the receiving section 111 determines whether or not a reception ultrasonic wave is received. Specifically, the receiving section 111 determines whether or not a reception ultrasonic wave is received at the reception frequency included in the reception information stored in the storage unit 120. When the receiving section 111 determines in step S402 that a reception ultrasonic wave is received (step S402: YES), the processing proceeds to step S403. When the receiving section 111 determines in step S402 that no reception ultrasonic wave is received (step S402: NO), on the other hand, the processing returns to step S401 to repeat the processing from step S401. That is, until the timing of transmission of a transmission ultrasonic wave, the processing of step S401 and step S402 is repeated to determine whether or not a reception ultrasonic wave is received. When the timing of transmission of a transmission ultrasonic wave comes first, the transmission control section 114 transmits the transmission ultrasonic wave in step S406 to be described later. When a reception ultrasonic wave is received first, on the other hand, processing from step S403 to be described later on down is performed.

In step S403, the frequency determining section 112 determines whether or not the transmission ultrasonic wave is yet to be transmitted. Specifically, in step S403, the frequency determining section 112 determines whether or not the transmission ultrasonic wave is yet to be transmitted, on the basis of the transmission state included in the transmission information stored in the storage unit 120. When the frequency determining section 112 determines in step S403 that the transmission ultrasonic wave is yet to be transmitted (step S403: YES), the processing proceeds to step S404. When the frequency determining section 112 determines in step S403 that the transmission ultrasonic wave is not yet to be transmitted, that is, the transmission ultrasonic wave has been transmitted (step S403: NO), on the other hand, the processing returns to step S401 to repeat the processing from step S401.

In step S404, the frequency determining section 112 determines whether or not the reception frequency of the reception ultrasonic wave and the transmission frequency of the transmission ultrasonic wave scheduled to be transmitted are the same. Specifically, the frequency determining section 112 determines whether or not the reception frequency of the reception ultrasonic wave and the transmission frequency of the transmission ultrasonic wave are the same, on the basis of the transmission frequency in the transmission information and the reception frequency in the reception information, the transmission information and the reception information being stored in the storage unit 120. When the frequency determining section 112 determines in step S404 that the reception frequency of the reception ultrasonic wave and the transmission frequency of the transmission ultrasonic wave are the same (step S404: YES), the processing proceeds to step S405. When the frequency determining section 112 determines in step S404 that the reception frequency of the reception ultrasonic wave and the transmission frequency of the transmission ultrasonic wave are not the same (step S404: NO), on the other hand, the processing returns to step S401 to repeat the processing from step S401.

In step S405, the frequency switching section 113 changes the transmission frequency of the transmission ultrasonic wave and the reception frequency of the reception ultrasonic wave. Specifically, the frequency switching section 113 switches and changes the transmission frequency in the transmission information and the reception frequency in the reception information, the transmission information and the reception information being stored in the storage unit 120, to a different frequency. The processing then returns to step S401 to repeat the processing from step S401.

In step S406, the transmission control section 114 transmits the transmission ultrasonic wave. Specifically, in step S406, the transmission control section 114 causes the transmitting device 220 to transmit the transmission ultrasonic wave at the transmission frequency included in the transmission information stored in the storage unit 120. In addition, after the transmission of the transmission ultrasonic wave, the transmission control section 114 changes the transmission state included in the transmission information stored in the storage unit 120, to "transmitted."

As described above, the ultrasonic sensor control device 100 according to the first embodiment includes the transmission control section 114 configured to control the transmitting device configured to transmit a transmission ultrasonic wave, the receiving section 111 configured to receive a reception ultrasonic wave, the frequency determining section 112, and the frequency switching section 113. The frequency determining section 112 determines a result of comparing a reception frequency that is a frequency of the reception ultrasonic wave received by the receiving section 111 and that is a frequency capable of being received by the receiving section 111, with a transmission frequency of the transmission ultrasonic wave that is transmitted under the control of the transmission control section 114. In addition, the frequency switching section 113 changes the transmission frequency and the reception frequency on the basis of a result of the determination by the frequency determining section 112.

With this configuration, the ultrasonic sensor control device 100 determines the result of comparing the transmission frequency of the transmission ultrasonic wave and the reception frequency of the reception ultrasonic wave with each other. It is thus possible to easily determine ultrasonic wave crosstalk from another device, and also easily cancel the crosstalk from the other device by changing the transmission frequency and the reception frequency.

In addition, in the first embodiment, the frequency determining section 112 determines whether or not the reception frequency of the reception ultrasonic wave received by the receiving section 111 and the transmission frequency are different from each other, in a predetermined period of time before the timing of transmission of the transmission ultrasonic wave. When it is determined that the reception frequency and the transmission frequency are the same, the frequency switching section 113 switches the transmission frequency and the reception frequency to a frequency different from the frequency scheduled to be transmitted.

With this configuration, in a case of using the ultrasonic sensor 10 according to the first embodiment, for example, the ultrasonic wave expected to cause crosstalk can be determined in advance, and with the use of a frequency of an ultrasonic wave different from the ultrasonic wave expected to cause crosstalk, the ultrasonic sensor 10 can transmit the ultrasonic wave and receive the reflected wave. That is, the processing of determining and cancelling crosstalk from another device can be performed efficiently before actual distance measurement, and in the actual distance measurement, erroneous measurement due to the crosstalk can be prevented.

Second Embodiment

One concrete embodiment has been described above. However, the foregoing embodiment is illustrative, and does not limit embodiments. For example, the foregoing embodiment illustrates an example in which the transmission frequency of the transmission ultrasonic wave and the reception frequency of the reception ultrasonic wave are determined before the transmission of the transmission ultrasonic wave, and the transmission frequency and the reception frequency are changed when the transmission frequency and the reception frequency are the same. Here, description will be further made regarding a configuration, focusing on the difference from the configuration of the first embodiment, of an ultrasonic sensor control device 100 according to a second embodiment that receives a plurality of reception ultrasonic waves and that determines the transmission frequency of the transmission ultrasonic wave and the reception frequencies of the plurality of reception ultrasonic waves.

FIG. 5 is a diagram illustrating a general configuration of an ultrasonic sensor 10 according to the second embodiment. As illustrated in FIG. 5, the configuration of the ultrasonic sensor 10 according to the second embodiment is different from that of the first embodiment in that the ultrasonic sensor device 200 includes a plurality of receiving devices 210.

FIG. 6 illustrates "frequency information," "transmission information," and "reception information" stored in the storage unit 120 of the ultrasonic sensor control device 100 according to the second embodiment. As illustrated in FIG. 6, the "reception information" stored in the storage unit 120 of the ultrasonic sensor control device 100 according to the second embodiment is different from that of the first embodiment in that reception states and reception frequencies for the plurality of receiving devices 210 are stored.

Processing performed by the ultrasonic sensor control device 100 according to the second embodiment will be described with reference to timing diagrams illustrated in FIGS. 7A to 7C.

Suppose in FIGS. 7A to 7C that the first frequency (UF1), for example, is set as the transmission frequency at a time of a start of the ultrasonic sensor control device 100. Further, suppose that the first frequency (UF1), the second frequency (UF2), and the third frequency (UF3) are set as the respective reception frequencies for a first receiving device, a second receiving device, and a third receiving device. In addition, the ultrasonic sensor control device 100 transmits an ultrasonic wave of the first frequency (UF1), the wave reflected by a target object is received by the first receiving device at the first frequency (UF1), and thus, the ultrasonic sensor control device 100 measures a distance to the target object.

Suppose in FIG. 7A that the transmitting device 220 transmits an ultrasonic wave at time T4, the transmitted ultrasonic wave is reflected by the target object, and the first receiving device receives the reflected ultrasonic wave at time T8. Meanwhile, suppose in FIG. 7A that another device which is different from the ultrasonic sensor control device 100 transmits an ultrasonic wave, and the first receiving device receives the ultrasonic wave at the first frequency (UF1) at time T1 and time T5.

In this case, in the example illustrated in FIG. 7A, the ultrasonic wave received by the first receiving device at time T5 is recognized as the ultrasonic wave transmitted from the transmitting device 220 at time T4 and then reflected by the target object. The target ultrasonic wave should be received at time T8, but the different ultrasonic wave is erroneously received at time T5. Thus, a time from the transmission of the ultrasonic wave from the transmitting device 220 to the reception of the ultrasonic wave is shortened. That is, distance measurement is performed erroneously.

On the other hand, in the example illustrated in FIG. 7B, ultrasonic waves of the first frequency (UF1), the second frequency (UF2), and the third frequency (UF3) are received by the first receiving device, the second receiving device, and the third receiving device, respectively, at time T1, time T2, and time T3. In this case, the frequency determining section 112 in the second embodiment determines that the ultrasonic wave of the first frequency (UF1) as the transmission frequency is received by the first receiving device in a timing before the transmitting device 220 transmits the ultrasonic wave.

On the basis of the result of the determination by the frequency determining section 112, the frequency switching section 113 switches the transmission frequency and the reception frequency for the first receiving device to a frequency different from the first frequency (UF1). Here, in the second embodiment, the second and third receiving devices other than the first receiving device also receive the ultrasonic waves of the second frequency (UF2) and the third frequency (UF3). Therefore, in a case where the transmission frequency of the transmission ultrasonic wave is switched to the second frequency (UF2) or the third frequency (UF3), which is a frequency different from the first frequency (UF1), a reception ultrasonic wave is erroneously received at time T6 or time T7.

Therefore, in the second embodiment, the frequency switching section 113 switches the frequency to a frequency different from the reception frequencies for the plurality of receiving devices 210. For example, in the example illustrated in FIG. 7B, the frequency of the transmission ultrasonic wave and the reception frequency for the first receiving device are switched to a fourth frequency (UF4). Consequently, in the example illustrated in FIG. 7B, no ultrasonic wave of the first frequency (UF1) is received at time T5. In addition, an ultrasonic wave of the fourth frequency (UF4) can be received correctly at time T8. It is thus possible to eliminate erroneous reception and perform correct distance measurement in the distance measuring system using the ultrasonic sensor control device 100.

In addition, in the ultrasonic sensor control device 100 in the second embodiment, the frequency switching section 113 may switch the transmission frequency and the reception frequency for the first receiving device to a reception frequency that is included in the reception frequencies for the plurality of receiving devices 210 and at which no reception ultrasonic wave is received. For example, in the example illustrated in FIG. 7C, the third receiving device does not receive any reception ultrasonic wave before the transmission of the transmission ultrasonic wave from the transmitting device 220. Hence, in the example illustrated in FIG. 7C, the frequency of the transmission ultrasonic wave and the reception frequency for the first receiving device are switched to the third frequency (UF3) which is not received by the third receiving device. Consequently, in the example illustrated in FIG. 7C, no ultrasonic wave of the first frequency (UF1) is received at time T5. In addition, an ultrasonic wave of the third frequency (UF3) can be received correctly at time T8. It is thus possible to eliminate erroneous reception and perform correct distance measurement in the distance measuring system using the ultrasonic sensor control device 100.

As described above, the receiving section 111 of the ultrasonic sensor control device 100 in the second embodiment receives a plurality of reception ultrasonic waves from the plurality of receiving devices 210 configured to receive the plurality of reception ultrasonic waves. In addition, the frequency determining section 112 determines whether or not the reception frequency of the reception ultrasonic wave received by the receiving section 111 and the transmission frequency are different from each other, in a predetermined period of time before a timing of transmission of the transmission ultrasonic wave. Further, when it is determined that the reception frequency and the transmission frequency are the same, the frequency switching section 113 switches the transmission frequency and a plurality of reception frequencies to a frequency different from the frequencies capable of being received by the plurality of receiving devices 210 at a time point of the determination in the frequency determining section 112.

With this configuration, the ultrasonic sensor 10 according to the second embodiment can detect the plurality of frequencies capable of being received by the plurality of receiving devices 210. Consequently, erroneous reception of ultrasonic waves originating from other systems can be reduced more. A more accurate distance measuring system can thus be realized.

Further, the receiving section 111 of the ultrasonic sensor control device 100 in the second embodiment receives a plurality of reception ultrasonic waves from the plurality of receiving devices 210 configured to receive the plurality of reception ultrasonic waves. In addition, the frequency determining section 112 determines whether or not the reception frequency of the reception ultrasonic wave received by the receiving section 111 and the transmission frequency are different from each other, in a predetermined period of time before a timing of transmission of the transmission ultrasonic wave. Further, when it is determined that the reception frequency and the transmission frequency are the same, the frequency switching section 113 may switch the transmission frequency and a plurality of reception frequencies to a frequency that is included in frequencies capable of being received by the plurality of receiving devices at a time point of the determination in the frequency determining section and that is different from the reception frequency of the reception ultrasonic wave received by the receiving section.

With this configuration, the ultrasonic sensor 10 according to the second embodiment can detect the plurality of frequencies capable of being received by the plurality of receiving devices 210. In addition, this configuration can reduce the number of applicable frequencies. Consequently, erroneous reception of ultrasonic waves originating from other systems can be reduced more. A more accurate distance measuring system can thus be realized.

Third Embodiment

A third embodiment will next be described. Note that, in the following description, when the same reference signs as in the first embodiment and/or the second embodiment are used, identical configurations to those of the first embodiment and/or the second embodiment are illustrated, and the preceding description is referred to unless particular description is made. Here, a plurality of transmission ultrasonic waves are transmitted, and timings of reception of a plurality of reception ultrasonic waves are determined. A configuration of an ultrasonic sensor 10 according to the third embodiment will be described focusing on the difference from the configuration (configurations) of the first embodiment and/or the second embodiment.

Figure 8:
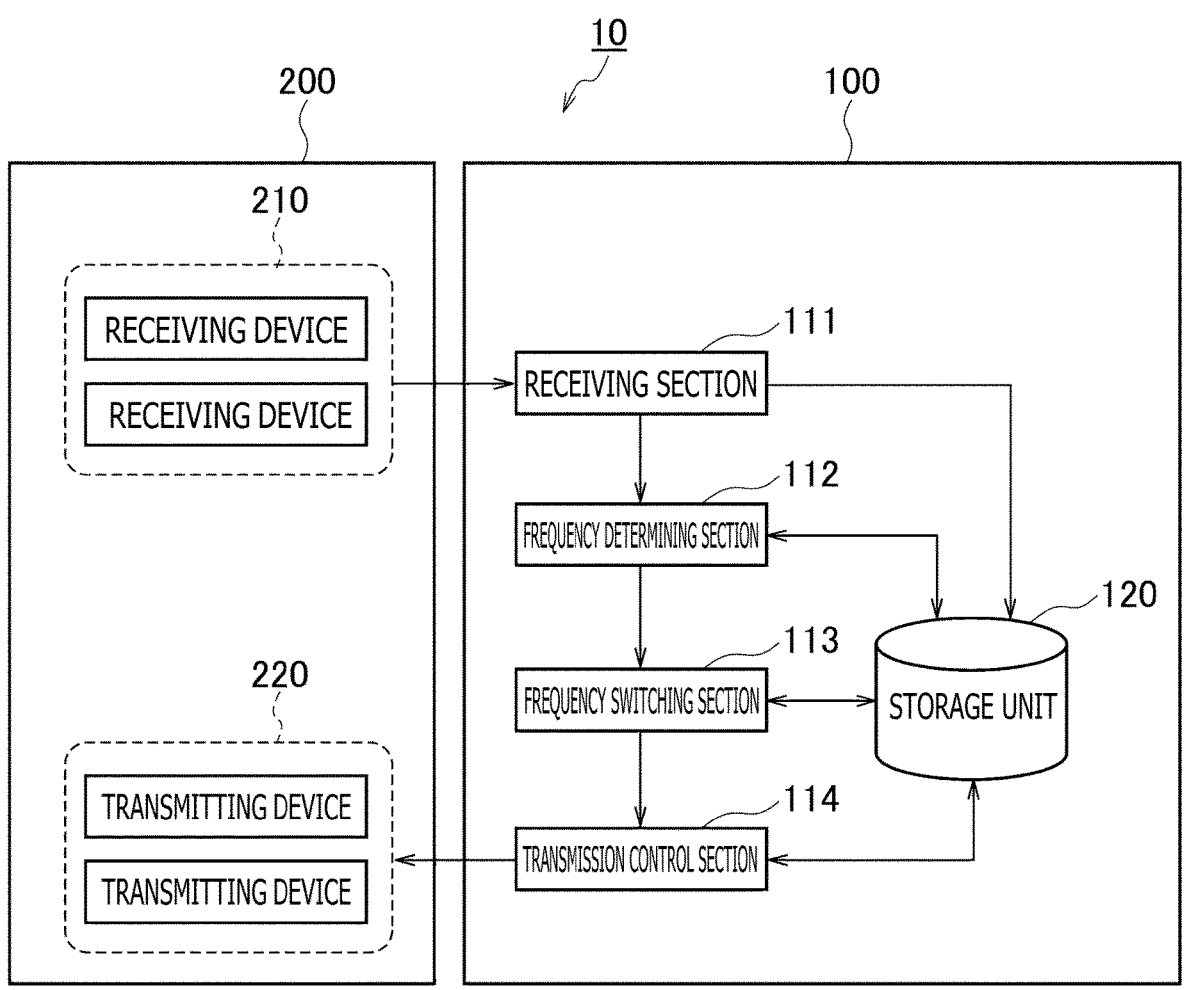
FIG. 8 is a block diagram illustrating a configuration of an ultrasonic sensor control device according to a third embodiment.

FIG. 8 is a diagram illustrating a general configuration of the ultrasonic sensor 10 according to the third embodiment. As illustrated in FIG. 8, the configuration of the ultrasonic sensor 10 according to the third embodiment is different from that (those) of the first embodiment and/or the second embodiment in that the ultrasonic sensor device 200 includes a plurality of transmitting devices 220 and a plurality of receiving devices 210.

Figure 9:
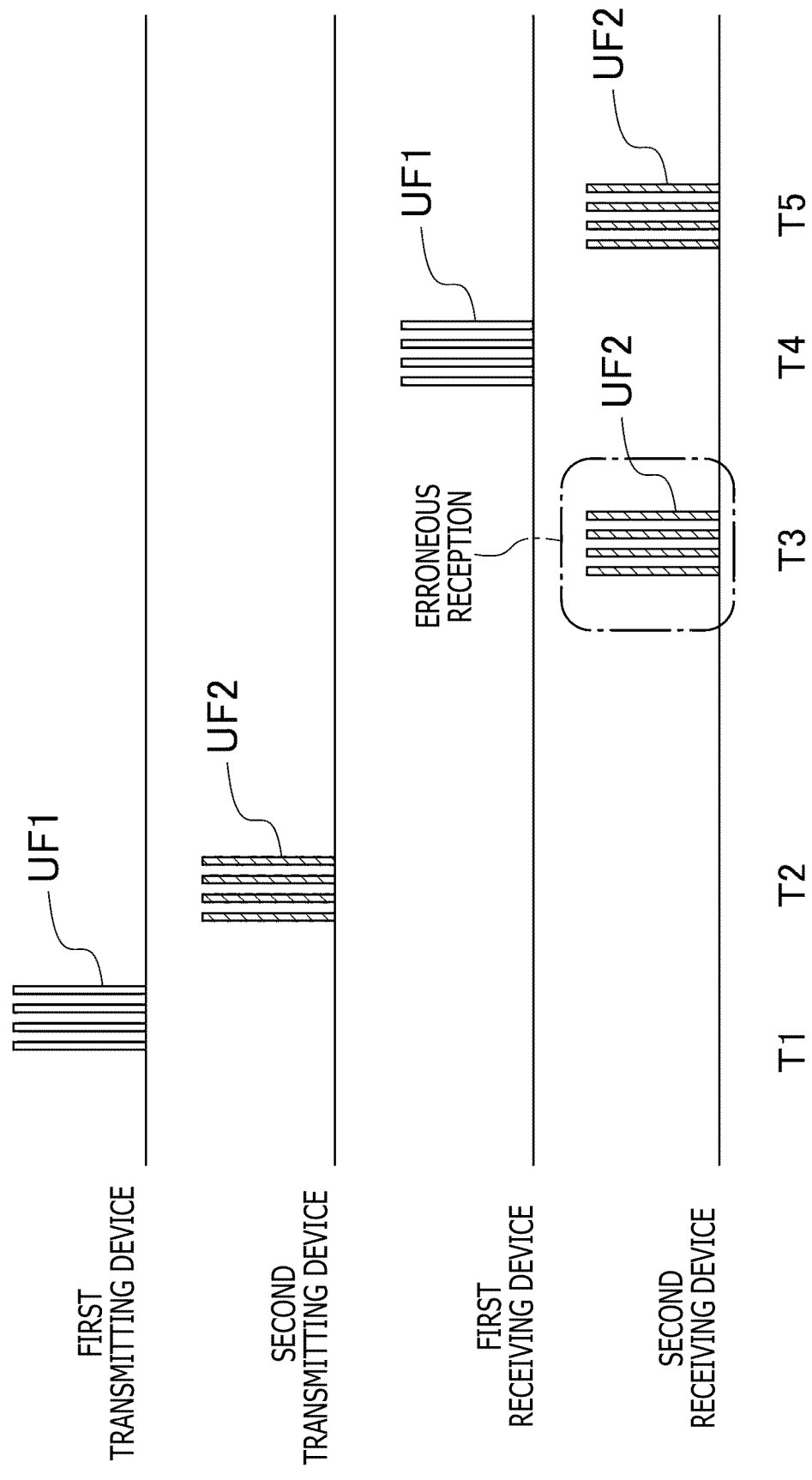
FIG. 9 is a diagram illustrating an example of frequency information, transmission information, and reception information according to the third embodiment.

FIG. 9 illustrates "frequency information," "transmission information," and "reception information" stored in the storage unit 120 of the ultrasonic sensor control device 100 according to the third embodiment. As illustrated in FIG. 9, the "transmission information" stored in the storage unit 120 of the ultrasonic sensor control device 100 according to the third embodiment is different from that of the second embodiment in that transmission states and transmission frequencies for the plurality of transmitting devices 220 are stored.

In addition, as illustrated in FIG. 9, the "transmission information" and the "reception information" stored in the storage unit 120 of the ultrasonic sensor control device 100 according to the third embodiment are different from those of the first and second embodiments in that items of transmission times and reception times are included. In the example illustrated in FIG. 9, "timing A" indicated as a transmission time denotes the transmission time of an ultrasonic wave transmitted by a first transmitting device. In addition, "timing A+time B" indicated as a transmission time denotes the transmission time of an ultrasonic wave transmitted by a second transmitting device, and denotes a time after "time B" has elapsed from "timing A." In addition, "timing C" and "timing D" denote the respective times at which a first receiving device and a second receiving device receive ultrasonic waves.

Processing performed by the ultrasonic sensor control device 100 according to the third embodiment will be described with reference to timing diagrams illustrated in FIG. 10A and FIG. 10B.

Figure 10:
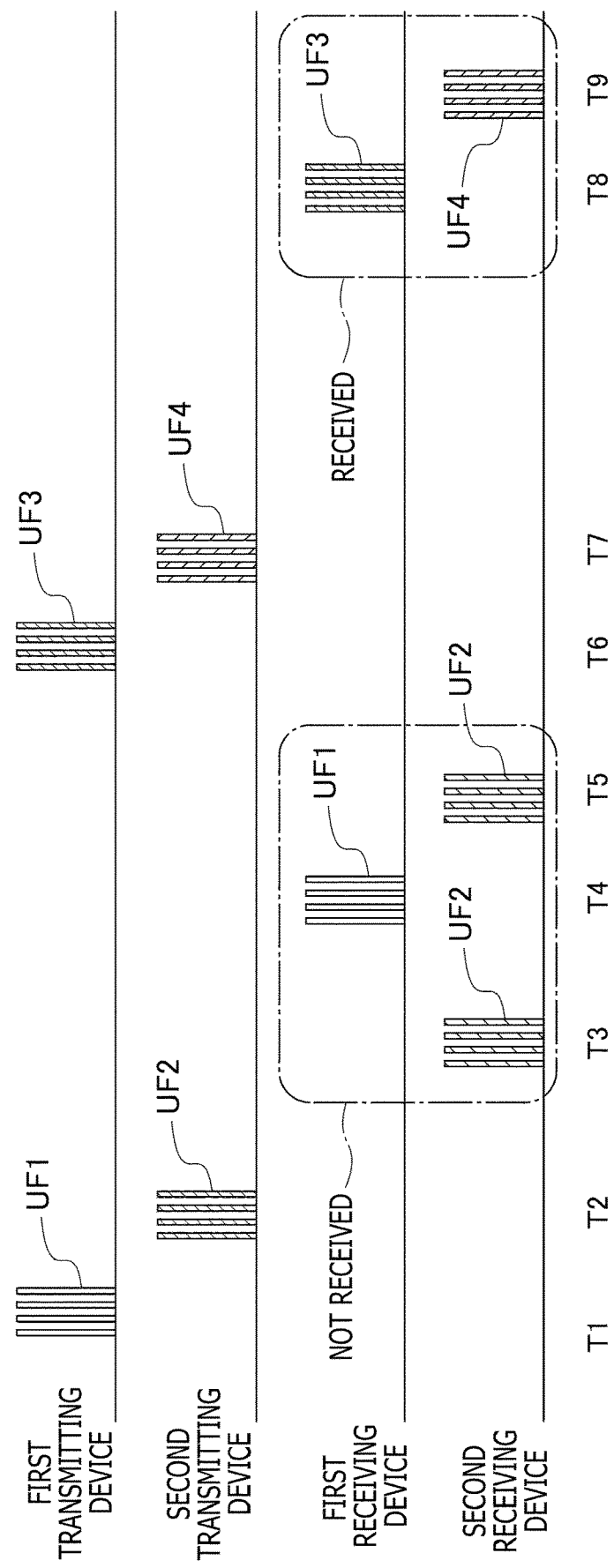
FIG. 10A is a timing diagram of assistance in explaining a state of crosstalk in an ultrasonic sensor.
FIG. 10B is a timing diagram of assistance in explaining processing in the ultrasonic sensor control device according to the third embodiment.

Suppose in FIG. 10A and FIG. 10B that a first frequency (UF1) and a second frequency (UF2), for example, are set as the respective transmission frequencies for the first transmitting device and the second transmitting device at a time of a start of the ultrasonic sensor control device 100. In addition, suppose that a first frequency (UF1) and a second frequency (UF2) are set as the respective reception frequencies for the first receiving device and the second receiving device. Moreover, the ultrasonic sensor control device 100 transmits transmission ultrasonic waves of the first frequency (UF1) and the second frequency (UF2) from the first transmitting device and the second transmitting device. Then, the wave reflected by a target object is received by the first receiving device at the first frequency (UF1) or received by the second receiving device at the second frequency (UF2). A distance to the target object is thus measured. Note that the respective transmission frequencies of the transmission ultrasonic waves transmitted from the first transmitting device and the second transmitting device correspond to a first transmission frequency and a second transmission frequency. Similarly, the respective reception frequencies received by the first receiving device and the second receiving device correspond to a first reception frequency and a second reception frequency.

Further, the third embodiment compares transmission order of the transmission ultrasonic waves transmitted from the first and second transmitting devices, with reception order of the reflected waves received by the first and second receiving devices, and thus determines whether there is signal crosstalk from another ultrasonic sensor system. Note that the transmission ultrasonic wave transmitted from the first transmitting device corresponds to a first transmission ultrasonic wave. In addition, the transmission ultrasonic wave transmitted from the second transmitting device corresponds to a second transmission ultrasonic wave. Similarly, the reception ultrasonic wave received by the first receiving device corresponds to a first reception ultrasonic wave. In addition, the reception ultrasonic wave received by the second receiving device corresponds to a second reception ultrasonic wave.

For example, in the example illustrated in FIG. 10A, the ultrasonic sensor 10 transmits the transmission ultrasonic waves in order of the first frequency (UF1) and the second frequency (UF2) from the first and second transmitting devices at time T1 and time T2. Here, when there is no signal crosstalk from another ultrasonic sensor, the first and second receiving devices receive the reflected waves in order of the first frequency (UF1) and the second frequency (UF2). However, in the example illustrated in FIG. 10A, an ultrasonic wave of the second frequency (UF2) is received first at time T3. The ultrasonic sensor 10 according to the present third embodiment can recognize the occurrence of crosstalk in the ultrasonic wave of the second frequency (UF2).

The processing performed by the ultrasonic sensor 10 according to the third embodiment will further be described with reference to FIG. 10B. For example, the ultrasonic sensor 10 in the third embodiment may not receive (not use, as received signals) the reception ultrasonic waves received at times T3 to T5 in FIG. 10B. Thereafter, the frequency switching section 113 changes the transmission frequencies for the first and second transmitting devices to a third frequency (UF3) and a fourth frequency (UF4), for example. At time T6 and time T7, ultrasonic waves of the third frequency (UF3) and the fourth frequency (UF4) are transmitted from the first and second transmitting devices.

Thereafter, at time T8 and time T9, the first and second receiving devices receive the respective reception ultrasonic waves of the third frequency (UF3) and the fourth frequency (UF4). The reception order of the ultrasonic waves of the third frequency (UF3) and the fourth frequency (UF4) received by the first and second receiving devices is the same as the transmission order of the transmission ultrasonic waves of the third frequency (UF3) and the fourth frequency (UF4) transmitted by the first and second transmitting devices at time T6 and time T7. Hence, processing such as distance measurement can be performed by using the reception ultrasonic waves of the third frequency (UF3) and/or the fourth frequency (UF4) in the ultrasonic sensor 10 in the third embodiment.

Outline of Processing Flow of Ultrasonic Sensor Control Device 100

Figure 11:
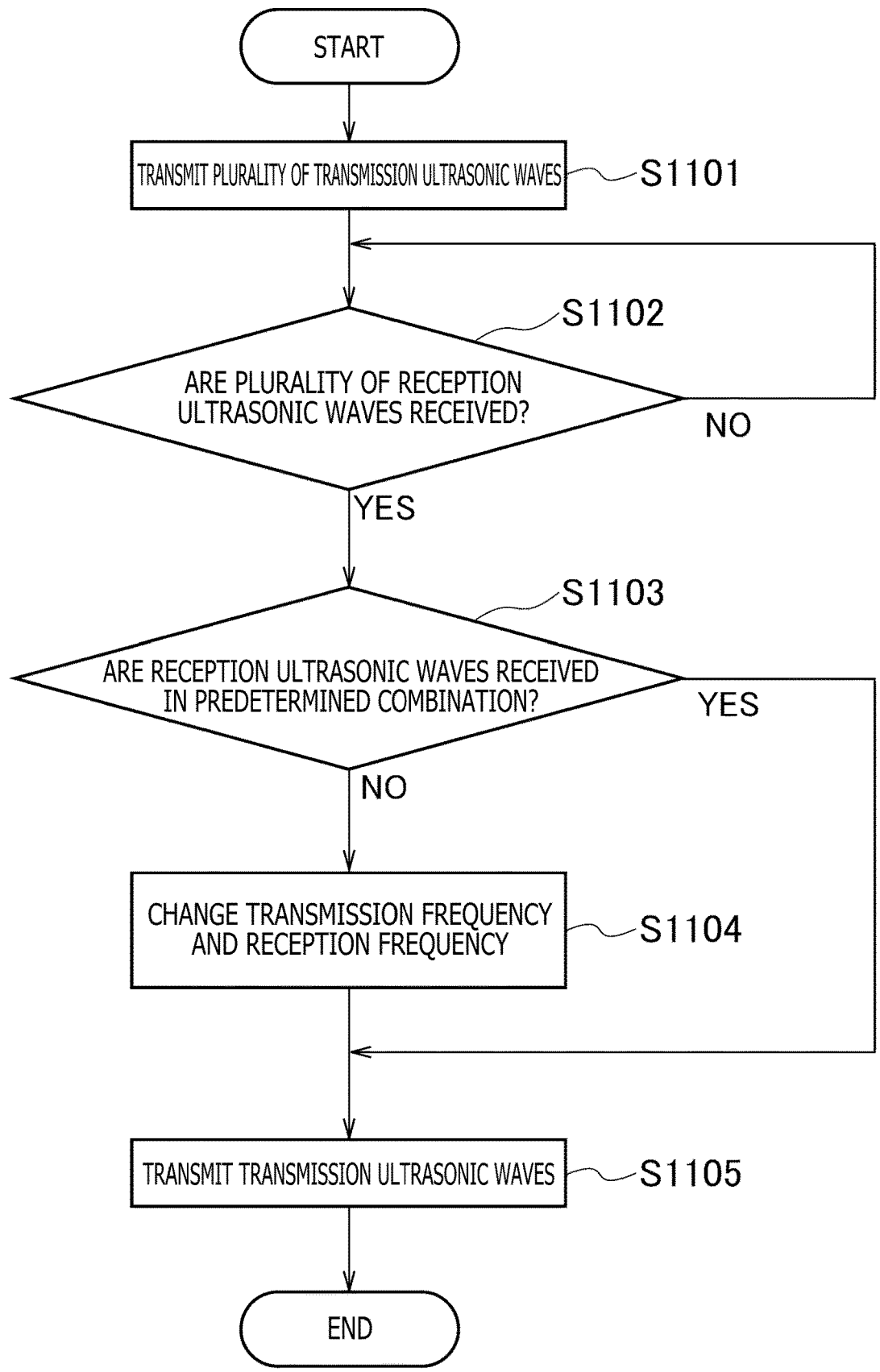
FIG. 11 is a flowchart illustrating an example of processing performed by the ultrasonic sensor control device according to the third embodiment.

Next, a flow of processing in the ultrasonic sensor control device 100 (ultrasonic sensor control method) according to the third embodiment will be illustrated with reference to a flowchart illustrated in FIG. 11. A series of operations of the ultrasonic sensor control device 100 illustrated in the flowchart of FIG. 11 is started when the ultrasonic sensor control device 100 is started, and the processing is ended in response to the transmission of transmission ultrasonic waves. In addition, the processing in the flowchart illustrated in FIG. 11 is also ended in response to the turning off of the power or a processing termination or time-out interrupt. In addition, in the following description of the flowchart, the same contents as described in conjunction with the foregoing ultrasonic sensor control device 100 will be omitted or described in a simplified manner.

In step S1101, the transmission control section 114 controls the transmitting device 220 such that the transmitting device 220 transmits transmission ultrasonic waves of a plurality of transmission frequencies in predetermined order (predetermined combination). The plurality of transmission ultrasonic waves are thus transmitted from the plurality of transmitting devices 220.

In step S1102, the receiving section 111 determines whether or not a plurality of reception ultrasonic waves are received. When the receiving section 111 determines in step S1102 that a plurality of reception ultrasonic waves are received (step S1102: YES), the processing proceeds to step S1103. When the receiving section 111 determines that no reception ultrasonic waves are received in step S1102 (step S1102: NO), on the other hand, the processing returns to step S1102. That is, the processing of step S1102 is repeatedly performed until a plurality of reception ultrasonic waves are received. Incidentally, in a state in which a plurality of reception ultrasonic waves are not received normally due to an abnormality in the ultrasonic sensor 10, for example, the processing illustrated in FIG. 11 may be ended by a time-out interrupt or other operations after a predetermined period of time elapses.

In step S1103, the frequency determining section 112 determines whether or not the received reception ultrasonic waves are received in a predetermined combination. Here, the predetermined combination is, for example, the transmission order of the transmission ultrasonic waves transmitted from the first transmitting device and the second transmitting device. When the frequency determining section 112 determines in step S1103 that the received reception ultrasonic waves are received in the predetermined combination (step S1103: YES), the processing proceeds to step S1105. When the frequency determining section 112 determines in step S1103 that the received reception ultrasonic waves are not received in the predetermined combination (step S1103: NO), on the other hand, the processing proceeds to step S1104.

In step S1104, the frequency switching section 113 changes the transmission frequencies of the transmission ultrasonic waves and the reception frequencies of the reception ultrasonic waves. Specifically, the frequency switching section 113 switches and changes, to different frequencies, the transmission frequencies in the transmission information regarding the plurality of transmitting devices 220 and the reception frequencies in the reception information regarding the plurality of receiving devices 210, the transmission information and the reception information being stored in the storage unit 120.

In step S1105, the transmission control section 114 transmits transmission ultrasonic waves. Specifically, in step S1105, the transmission control section 114 causes the plurality of transmitting devices 220 to transmit the transmission ultrasonic waves in predetermined order at the transmission frequencies in the transmission information stored in the storage unit 120. In addition, after the transmission of the transmission ultrasonic waves, the transmission control section 114 changes the transmission states included in the transmission information regarding the plurality of transmitting devices 220 stored in the storage unit 120, to "transmitted."

As described above, an example has been illustrated in which the frequency determining section 112 of the ultrasonic sensor 10 in the foregoing third embodiment determines the reception order of the ultrasonic waves of the reception frequencies received by the first and second receiving devices, according to the transmission order of the ultrasonic waves of the transmission frequencies transmitted from the first and second transmitting devices. In the third embodiment, a configuration in which ultrasonic waves are transmitted or received simultaneously, for example, instead of in the transmission order or the reception order described above may also be adopted. For example, transmission ultrasonic waves of different transmission frequencies may simultaneously be transmitted from the first and second transmitting devices, and the frequency determining section 112 may determine whether or not the reception ultrasonic waves received by the first and second receiving devices are received simultaneously. Note that, in this case, when the frequency determining section 112 determines whether or not the reception ultrasonic waves received by the first and second receiving devices are received simultaneously, the reception ultrasonic waves received by the first and second receiving devices do not need to be received perfectly simultaneously. The frequency determining section 112 may determine whether or not the reception ultrasonic waves received by the first and second receiving devices are received simultaneously with a margin of a predetermined period of time provided.

As described above, the transmission control section 114 of the ultrasonic sensor 10 in the third embodiment controls the transmitting device 220 such that the transmitting device 220 successively transmits a first transmission ultrasonic wave of the first transmission frequency and a second transmission ultrasonic wave of the second transmission frequency. Further, the receiving section 111 receives a first reception ultrasonic wave and a second reception ultrasonic wave from the plurality of receiving devices 210 configured to receive a plurality of the reception ultrasonic waves. In addition, the frequency determining section 112 determines a result of comparing the first reception frequency of the first reception ultrasonic wave and the second reception frequency of the second reception ultrasonic wave with the first transmission frequency and the second transmission frequency. Moreover, when the first reception frequency is different from the first transmission frequency or when the second reception frequency is different from the second transmission frequency, the frequency switching section 113 switches the first transmission frequency, the second transmission frequency, the first reception frequency, and the second reception frequency to frequencies different from the first transmission frequency and the second transmission frequency.

With this configuration, the ultrasonic sensor 10 according to the third embodiment can determine whether or not there is crosstalk from another device, on the basis of the predetermined combination of the transmission frequencies and the reception frequencies. That is, in the third embodiment, the processing of determining and cancelling ultrasonic wave crosstalk from another device can efficiently be performed even after the transmission of the transmission ultrasonic waves from the transmitting devices 220, and erroneous measurement due to the crosstalk can be prevented in actual distance measurement.

In addition, the transmission control section 114 of the ultrasonic sensor 10 in the third embodiment controls the transmitting devices 220 such that the transmitting devices 220 successively transmit a first transmission ultrasonic wave of the first transmission frequency and a second transmission ultrasonic wave of the second transmission frequency. In addition, the receiving section 111 receives a first reception ultrasonic wave and a second reception ultrasonic wave from the plurality of receiving devices 210 configured to receive a plurality of the reception ultrasonic waves. In addition, the frequency determining section 112 determines a result of comparing the first reception frequency of the first reception ultrasonic wave and the second reception frequency of the second reception ultrasonic wave with the first transmission frequency and the second transmission frequency. Further, when the first reception frequency and the second reception frequency are the same frequency as either the first transmission frequency or the second transmission frequency and when the first reception ultrasonic wave and the second reception ultrasonic wave are not received in the same timing, the frequency switching section 113 may switch the first transmission frequency, the second transmission frequency, the first reception frequency, and the second reception frequency to frequencies different from the first transmission frequency and the second transmission frequency.

With this configuration, the ultrasonic sensor 10 according to the third embodiment can determine whether or not there is crosstalk from another device, on the basis of the predetermined combination of the transmission frequencies and the reception frequencies. That is, in the third embodiment, the processing of determining and cancelling ultrasonic wave crosstalk from another device can efficiently be performed even after the transmission of the transmission ultrasonic waves from the transmitting devices 220, and erroneous measurement due to the crosstalk can be prevented in actual distance measurement.

Other Embodiments

It is to be noted that the foregoing embodiments are an example of embodiments to be implemented. Therefore, it is needless to say that the present embodiment is not limited to the foregoing embodiments, and even in other embodiments, various changes can be made according to design or other requirements within a scope not deviating from technical concepts according to the present embodiment.

A method has been illustrated in which the ultrasonic sensor 10 in the foregoing third embodiment determines whether or not there is crosstalk, on the basis of the predetermined order (combination) of the plurality of transmission ultrasonic waves and the plurality of reception ultrasonic waves. For example, a predetermined code may be generated according to the combination of the transmission order of the plurality of transmission ultrasonic waves, and whether or not reception ultrasonic waves are received in the receiving devices 210 in the order of the predetermined code may be determined. For example, the transmission of an ultrasonic wave from the first transmitting device is represented by "0," and the transmission of an ultrasonic wave from the second transmitting device is represented by "1." In this case, when the transmission of ultrasonic waves from the first and second transmitting devices is performed four consecutive times, codes having 14 patterns, that is, "0001" to "1110" excluding "0000" and "1111," can be generated. Further, when the number of times of transmission of ultrasonic waves from the first and second transmitting devices is increased, the number of applicable codes is also increased, so that even when systems of the same kind are used, for example, crosstalk can be prevented.

In addition, as described above, in the ultrasonic sensor control device 100 in the foregoing embodiment, the frequency determining section 112 compares the reception frequency of a reception ultrasonic wave and the transmission frequency of a transmission ultrasonic wave with each other, and determines whether or not the reception frequency and the transmission frequency are the same. The foregoing embodiment does not limit the configuration of the embodiment. For example, a configuration in which, with the use of an ultrasonic sensor 10 capable of changing a frequency characteristic, the frequency characteristic of the ultrasonic sensor 10 is changed on the basis of a result of reception determination may be applied to the ultrasonic sensor control device 100. In addition, a configuration in which a plurality of ultrasonic sensors 10 using some dedicated frequencies determine the frequencies and change and use the frequencies may be adopted. Further, a configuration in which, with an ultrasonic sensor 10 capable of transmitting and receiving ultrasonic waves of frequencies in a wider range, the ultrasonic sensor control device 100 can selectively use a plurality of different frequencies practically by changing a driving waveform of the ultrasonic wave or applying a plurality of methods for analyzing received waveforms may be adopted.

In addition, a computer program (ultrasonic sensor control program) for causing a computer to perform the processing in the foregoing ultrasonic sensor control device 100 and a computer readable recording medium on which the program is recorded are included in the scope of the present embodiment. Here, any kind of the computer readable recording medium is available. Further, the above-described computer program is not limited to the program recorded on the above-described recording medium, and may be transmitted via a telecommunication line, a wireless or wire communication line, or a network typified by the Internet, for example.

What is claimed is:

1. An ultrasonic sensor control device comprising:
   a transmission control section configured to control a transmitting device which is configured to transmit a transmission ultrasonic wave;
   a receiving section configured to receive a plurality of reception ultrasonic waves from a plurality of receiving devices configured to receive the plurality of reception ultrasonic waves;
   a frequency determining section configured to:
      determine a result of comparing a reception frequency that is a frequency of a reception ultrasonic wave of the plurality of reception ultrasonic waves received by the receiving section and that is a frequency capable of being received by the receiving section, with a transmission frequency of the transmission ultrasonic wave that is transmitted under control of the transmission control section; and
      determine whether or not the reception frequency of the reception ultrasonic wave received by the receiving section and the transmission frequency are different from each other, in a predetermined period of time before a timing of transmission of the transmission ultrasonic wave; and
   a frequency switching section configured to:
      change the transmission frequency and the reception frequency on a basis of a result of the determination by the frequency determining section; and
      switch the transmission frequency and a plurality of reception frequencies of the plurality of reception ultrasonic waves to a frequency different from the frequencies capable of being received by the plurality of receiving devices at a time point of the determination by the frequency determining section, when the frequency determining section determines that the reception frequency and the transmission frequency are same.

2. The ultrasonic sensor control device according to claim 1, wherein
   the frequency determining section is further configured to determine whether or not the reception frequency of the reception ultrasonic wave received by the receiving section and the transmission frequency are different from each other, in a predetermined period of time before a timing of transmission of the transmission ultrasonic wave, and when the frequency determining section determines that the reception frequency and the transmission frequency are same, the frequency switching section is further configured to switch the transmission frequency and the reception frequency to a frequency different from the frequency scheduled to be transmitted.

3. An ultrasonic sensor control device comprising:
a transmission control section configured to control a transmitting device which is configured to transmit a transmission ultrasonic wave;
a receiving section configured to receive a plurality of reception ultrasonic waves from a plurality of receiving devices configured to receive the plurality of reception ultrasonic waves;
a frequency determining section configured to:
  determine a result of comparing a reception frequency that is a frequency of a reception ultrasonic wave of the plurality of reception ultrasonic waves received by the receiving section and that is a frequency capable of being received by the receiving section, with a transmission frequency of the transmission ultrasonic wave that is transmitted under control of the transmission control section; and
  determine whether or not the reception frequency of the reception ultrasonic wave received by the receiving section and the transmission frequency are different from each other, in a predetermined period of time before a timing of transmission of the transmission ultrasonic wave; and
a frequency switching section configured to:
  change the transmission frequency and the reception frequency on a basis of a result of the determination by the frequency determining section; and
  switch the transmission frequency and a plurality of reception frequencies of the plurality of reception ultrasonic waves to a frequency that is included in frequencies capable of being received by the plurality of receiving devices at a time point of the determination by the frequency determining section and that is different from the reception frequency of the reception ultrasonic wave received by the receiving section, when the frequency determining section determines that the reception frequency and the transmission frequency are same.

4. An ultrasonic sensor control device comprising:
a transmission control section configured to control a transmitting device which is configured to transmit a transmission ultrasonic wave, wherein the transmission control section controls the transmitting device such that the transmitting device successively transmits a first transmission ultrasonic wave of a first transmission frequency and a second transmission ultrasonic wave of a second transmission frequency;
a receiving section configured to receive a first reception ultrasonic wave and a second reception ultrasonic wave from a plurality of receiving devices configured to receive a plurality of reception ultrasonic waves;
a frequency determining section configured to determine a result of comparing a first reception frequency of the first reception ultrasonic wave and a second reception frequency of the second reception ultrasonic wave with the first transmission frequency and the second transmission frequency; and
a frequency switching section configured to switch the first transmission frequency, the second transmission frequency, the first reception frequency, and the second reception frequency to frequencies different from the first transmission frequency and the second transmission frequency when the first reception frequency is different from the first transmission frequency or when the second reception frequency is different from the second transmission frequency.

5. An ultrasonic sensor control device comprising:
a transmission control section configured to control a plurality of transmitting devices such that the plurality of transmitting devices transmit a first transmission ultrasonic wave of a first transmission frequency and a second transmission ultrasonic wave of a second transmission frequency simultaneously;
a receiving section configured to receive a first reception ultrasonic wave and a second reception ultrasonic wave from a plurality of receiving devices configured to receive a plurality of reception ultrasonic waves;
a frequency determining section configured to determine a result of comparing a first reception frequency of the first reception ultrasonic wave and a second reception frequency of the second reception ultrasonic wave with the first transmission frequency and the second transmission frequency; and
a frequency switching section configured to switch the first transmission frequency, the second transmission frequency, the first reception frequency, and the second reception frequency to frequencies different from the first transmission frequency and the second transmission frequency, when the first reception frequency and the second reception frequency are a same frequency as either the first transmission frequency or the second transmission frequency and when the first reception ultrasonic wave and the second reception ultrasonic wave are not received in a same timing.

* * * * *